(12) United States Patent
Huff et al.

(10) Patent No.: US 11,919,495 B2
(45) Date of Patent: Mar. 5, 2024

(54) METHOD AND DEVICE FOR OPERATING A BRAKE SYSTEM OF A MOTOR VEHICLE, BRAKE SYSTEM, AND MOTOR VEHICLE

(71) Applicant: Robert Bosch GmbH, Stuttgart (DE)

(72) Inventors: Mike Huff, Plymouth, MI (US);
Anatoly Malkin, Stuttgart (DE);
Wadim Henning, Schwäbisch Hall (DE)

(73) Assignee: ROBERT BOSCH GMBH, Stuttgart (DE)

( * ) Notice: Subject to any disclaimer, the term of this patent is extended or adjusted under 35 U.S.C. 154(b) by 368 days.

(21) Appl. No.: 17/433,418

(22) PCT Filed: Mar. 13, 2020

(86) PCT No.: PCT/EP2020/056758
§ 371 (c)(1),
(2) Date: Aug. 24, 2021

(87) PCT Pub. No.: WO2020/233855
PCT Pub. Date: Nov. 26, 2020

(65) Prior Publication Data
US 2022/0144240 A1 May 12, 2022

(30) Foreign Application Priority Data
May 18, 2019 (DE) .......................... 102019207284.4

(51) Int. Cl.
*B60T 17/22* (2006.01)
*B60T 13/62* (2006.01)
*B60T 13/68* (2006.01)

(52) U.S. Cl.
CPC ............ *B60T 17/221* (2013.01); *B60T 13/62* (2013.01); *B60T 13/686* (2013.01);
(Continued)

(58) Field of Classification Search
CPC ...... B60T 13/745; B60T 13/686; B60T 13/62; B60T 17/221; B60T 2270/404; B60T 2270/406; B60T 2270/82
See application file for complete search history.

(56) References Cited

U.S. PATENT DOCUMENTS 8,589,116 B2 * 11/2013 Jordan .................... G01S 7/295
701/31.7
2006/0063980 A1 * 3/2006 Hwang .................. G16H 20/30
702/183
(Continued)

FOREIGN PATENT DOCUMENTS

| CN | 102046440 A | 5/2011 |
| CN | 104105626 A | 10/2014 |

(Continued)

OTHER PUBLICATIONS

International Search Report for PCT/EP2020/056758 dated May 19, 2020.

*Primary Examiner* — Bradley T King
(74) *Attorney, Agent, or Firm* — NORTON ROSE FULBRIGHT US LLP

(57) ABSTRACT

A method for operating a brake system of a motor vehicle. The brake system includes a master brake cylinder operable by a user and a pressure generator driven by an electric motor, for generating a hydraulic system pressure, and includes at least one hydraulically operable friction brake. On the inlet side, the at least one friction brake is assigned a proportioning valve acted upon by the system pressure, to adjust a hydraulic actuating pressure for the friction brake. The pressure generator is given a setpoint value for carrying out a testing operation. The setpoint value is selected so as to be smoothed by a logistical growth function.

12 Claims, 4 Drawing Sheets

(52) U.S. Cl.
CPC ... *B60T 2270/404* (2013.01); *B60T 2270/406* (2013.01); *B60T 2270/82* (2013.01)

(56) References Cited

U.S. PATENT DOCUMENTS

| | | | |
|---|---|---|---|
| 2009/0187320 A1* | 7/2009 | Antanaitis | B60L 3/0076 |
| | | | 701/70 |
| 2013/0304335 A1* | 11/2013 | Suzuki | B60W 30/18136 |
| | | | 701/70 |
| 2016/0020928 A1* | 1/2016 | Ayichew | H04L 25/03261 |
| | | | 701/70 |
| 2017/0106843 A1 | 4/2017 | Jeong | |
| 2018/0015912 A1 | 1/2018 | Foitzik et al. | |
| 2020/0353905 A1* | 11/2020 | Schmalbruch | B60T 13/662 |
| 2020/0398801 A1* | 12/2020 | Woerz | F16D 61/00 |
| 2022/0009464 A1* | 1/2022 | Luo | B60T 13/662 |

FOREIGN PATENT DOCUMENTS

| | | |
|---|---|---|
| CN | 106585599 A | 4/2017 |
| DE | 102012204247 A1 | 9/2013 |
| DE | 102012025247 A1 | 6/2014 |
| DE | 112015004026 T5 | 5/2017 |
| DE | 102017214135 A1 | 2/2019 |
| EP | 891275 B1 | 10/1997 |
| JP | H11341604 A | 12/1999 |
| JP | H11348769 A | 12/1999 |
| JP | 2001260856 A | 9/2001 |
| JP | 2015197370 A | 11/2015 |
| WO | 9739931 A1 | 10/1997 |

\* cited by examiner

METHOD AND DEVICE FOR OPERATING A BRAKE SYSTEM OF A MOTOR VEHICLE, BRAKE SYSTEM, AND MOTOR VEHICLE

The present invention relates to a method for operating a brake system of a motor vehicle. The brake system including a master brake cylinder operable by a user and a pressure generator driven by an electric motor, for generating a hydraulic system pressure, and includes at least one hydraulically operable friction brake. On the inlet side, the at least one friction brake is assigned a proportioning valve acted upon by the system pressure, to adjust a hydraulic actuating pressure for the friction brake. The pressure generator is given a setpoint value for carrying out a testing operation.

In addition, the present invention relates to a device for operating the brake system described above. The device includes a control unit, which is configured to specify the setpoint value for carrying out a testing operation. Furthermore, the present invention relates to a brake system including such a device, as well as a motor vehicle including the above-mentioned brake system.

BACKGROUND INFORMATION

Methods of the type mentioned above are available in the related art. In addition to the master brake cylinder operable by a user, in particular, using a brake pedal, brake systems of today also include a separately powered brake system, which may also initiate or carry out a braking action independently of the user. To that end, such a separately powered brake system includes an, in particular, electrically controllable pressure generator, which, if necessary, generates a hydraulic system pressure in the brake system independently of the master brake cylinder. In this context, the pressure generator is normally driven by an electric motor and includes, for example, a piston displaceable in a cylinder to generate the system pressure. The master brake cylinder and pressure generator may then be suitably interconnected with the hydraulic circuit of the brake system via one or more valves, which means that the system pressure may be generated by the master brake cylinder alone, by the pressure generator alone, or jointly by the master brake cylinder and pressure generator, in particular, without the pressure generation of the one having a negative effect on the pressure generation of the other.

Friction brakes, which are connected by a controllable proportioning valve to the hydraulic circuit that supplies the system pressure, are used, in order to generate a desired braking force on wheels of the motor vehicle. The pressure acting upon the specific friction brake is adjusted by controlling the proportioning valve.

For example, in order to carry out a testing operation during a dead stop or after the ignition or the switching-off of the motor vehicle, the pressure generator may be given a setpoint value, in order to ascertain, for example, with the aid of sensor data, whether the pressure generator is functioning as expected.

SUMMARY

A method in accordance with the present invention may have the advantage that noise generated by the testing operation, as well as the wear of the pressure generator, may be minimized. At the same time, vibrations, which are generated by the testing operation and may have an effect on the rest of the hydraulic circuit and/or the rest of the brake system, are reduced, which means that further components of the brake system are also protected. To this end, the present invention provides for the setpoint value to be selected so as to be smoothed by a logistical growth function. The logistical growth function allows the setpoint value to be specified so as to increase not stepwise, but gently, and to stagnate gently, which means that the pressure generator is prevented from moving or being actuated in a jerky manner. The prevention of jerky movements reduces the generation of noise during the operation of the pressure generator, as well as the generation of vibrations and wear.

The following function is preferably used as a logistical growth function:

$$y(t) = y(t - \Delta t) + R \cdot y(t - \Delta t) \cdot \left(1 - \frac{y(t - \Delta t)}{K}\right),$$

where y(t) represents the setpoint value at time t, y(t−Δt) represents the setpoint value at the previous time, R represents the growth rate, and K represents the step height of the setpoint value. The behavior of the pressure generator is advantageously adjusted by this simple formula, in view of desired step height K and adjustable growth rate R.

According to a preferred further refinement of the present invention, a value very small in comparison to step height K, in particular, 1% of step height K or less, is selected as starting value y(0). This ensures that in the testing operation, the pressure generator is started up gently, and/or the pressure is initially increased slowly.

It is particularly preferable for a value between 0.05 and 0.0005, in particular, between 0.04 and 0.001, in particular, of 0.04 or 0.001, to be set as a starting value y(0). This results in advantageous performance of the pressure generator in the testing operation. The starting value is optionally adjustable to boundary conditions.

Growth rate R is preferably set to a value between 0.7 and 0.1, in particular, between 0.6 and 0.2, and particular preferably, to 0.6 or 0.2. Through this, the setpoint value is attained within a sufficiently short period of time, without a jerky movement of the pressure generator being produced.

A device of an example embodiment of the present invention is distinguished in that during normal use, the control unit is specially configured to execute the method of the present invention. This yields the advantages already mentioned above.

A brake system of an example embodiment of the present invention distinguishes itself through the device of the present invention. This yields the advantages already mentioned above.

The motor vehicle of an example embodiment of the present invention distinguishes itself through the brake system of the present invention. This yields the advantages already mentioned above.

Further advantages and preferred features and combinations of features are derived, in particular, from what is described above, and disclosed in the following. In the following, the present invention shall be explained in greater detail in light of the figures.

DETAILED DESCRIPTION OF EXAMPLE EMBODIMENTS

Figure 1:
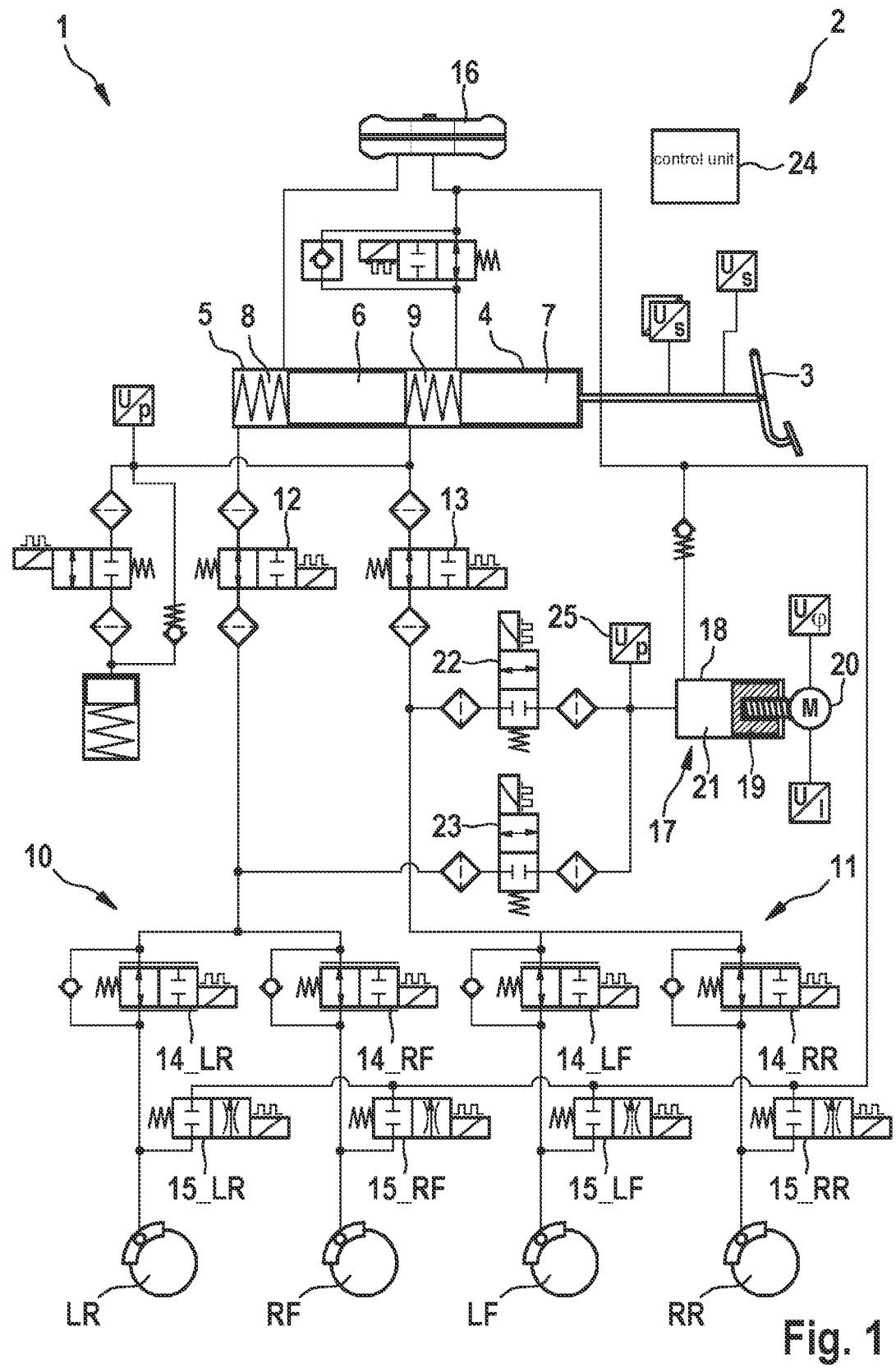
FIG. 1 shows a schematic representation of an advantageous brake system of a motor vehicle in accordance with an example embodiment of the present invention.

FIG. 1 shows a schematic representation of a brake system 1 for a motor vehicle 2 not described here in further detail.

Brake system 1 includes a master brake cylinder 4, which is operable by a brake pedal 3, takes the form of a tandem master brake cylinder, and has, in this respect, two hydraulic pistons 6 and 7 supported so as to be axially displaceable in a cylinder 5. Together with cylinder 5, hydraulic pistons 6, 7 form pressure chambers 8 and 9, respectively, which are connected hydraulically to brake circuits 10, 11, respectively, by controllable circuit separating valves 12, 13, respectively.

Presently, each brake circuit 10, 11 includes two friction brakes LR, RF and LF, RR, respectively, which are operable hydraulically. In this context, inlet valves 14_LR, 14_RF and 14_LF and 14_RR are preconnected, and controllable exhaust valves 15_LR, 15_RF and 15_LF and 15_RR are post-connected, to friction brakes LR-RR, respectively, in order to distribute the hydraulic pressure supplied by master brake cylinder 4 to friction brakes LR-RR according to demand. In this case, inlet valves 14 all take the form of proportioning valves, which means that different flow cross-sections may be set as a function of their activation, in order to set the hydraulic pressure acting upon the specific friction brake LR-RR according to demand. To that end, inlet valves 14 are preferably controlled in a pulse-width modulated manner. The exhaust valves preferably take the form of control valves and optionally take the form of proportioning valves and are controllable in a pulse-width modulated manner. On the output side, the exhaust valves are connected to a tank 16 for receiving and supplying the hydraulic medium of brake system 1.

In addition to master brake cylinder 4, brake system 1 includes a separately powered braking element in the form of a pressure generator 17 controllable by an electric motor. This includes a piston 19, which is supported in a cylinder 18 so as to be radially sealed and axially displaceable and is actuated by an electric motor 20. Piston 19 encloses, with cylinder 18, a further pressure chamber 21, which is connectible to brake circuits 10 and 11 via control valves 22 and 23, between separating valves 12 and 13 and inlet valves 14.

In normal operation, pressure generator 17 is controlled by a control unit 24 only indicated here, as a function of a braking request inputted by brake pedal 3, and/or independently of it. Thus, the system pressure available in brake system 1 upstream from inlet valves 14 may be supplied by master brake cylinder 4 and/or pressure generator 17. In the case of braking actions, which are carried out in an automated manner, the system pressure is generated, in particular, by pressure generator 17 alone.

In order to ensure the operability of brake system 1, it is preferably subjected to a testing operation regularly, for example, when the motor vehicle is standing still, in particular, after the ignition is switched on or off. In this context, control unit 24 drives pressure generator 17 to generate a hydraulic pressure in brake system 1, which is monitored, in particular, by one or more pressure sensors 25, and is optionally monitored during simultaneous operation of one or more of inlet or exhaust valves 14, 15 or even control valves 12, 13, 22, 23, in order to determine if the hydraulic pressure is behaving as expected; and with that, the operability of brake system 1 may be determined. Thus, the pressure is built up, in particular, in a first step by setting a system pressure with the aid of pressure generator 17, and in a further step by proportionally controlling inlet valves 14; in particular, circuit separating valves 12, 13 being closed, and separating valves 22, 23 being open.

According to the present exemplary embodiment, control unit 24 is configured to specify the setpoint value of the hydraulic pressure supplied by pressure generator 17 for a testing operation, so as to be smoothed by a logistical growth function.

Figure 2:
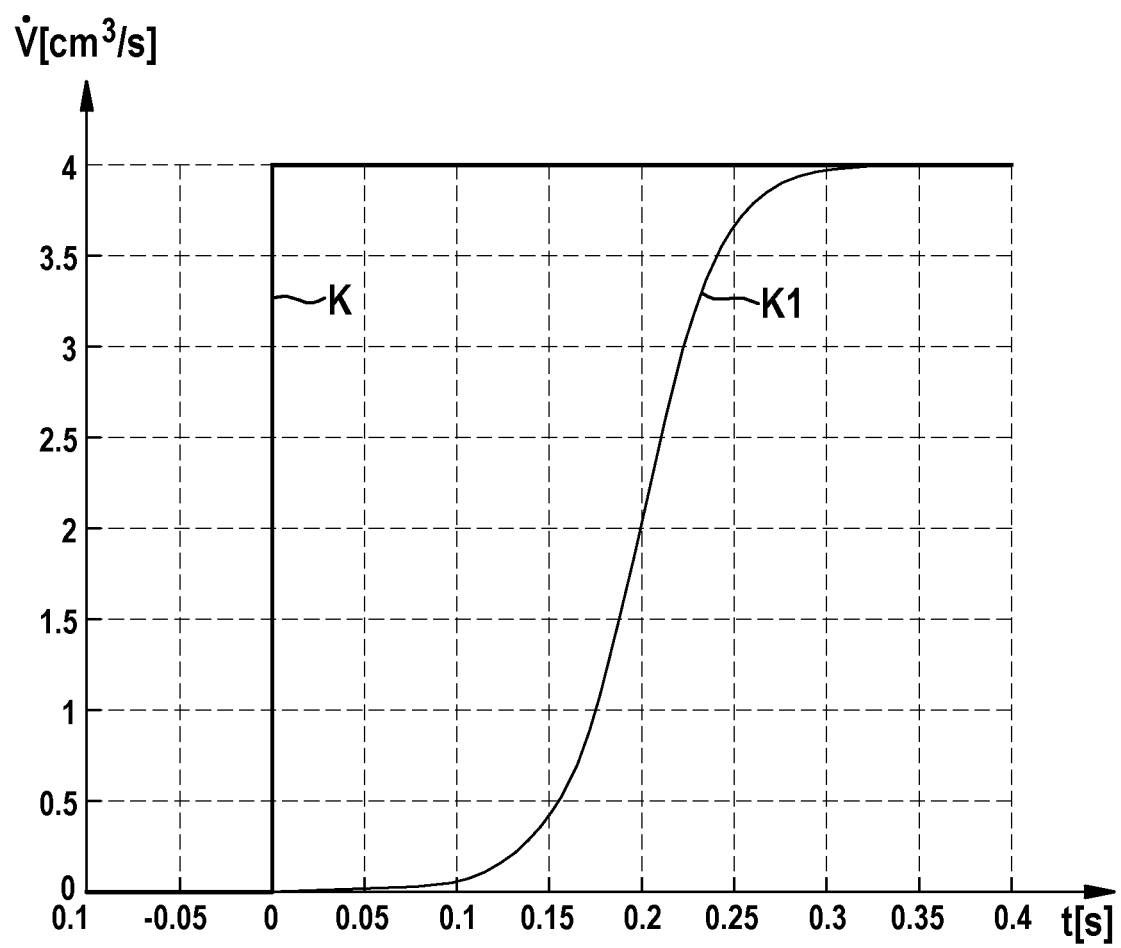
FIG. 2 shows a first graph for explaining advantageous operation of the brake system from FIG. 1 in accordance with an example embodiment of the present invention.

To that end, FIG. 2 shows, in a graph, the volumetric flow rate $\dot{V}$, which is plotted versus time t, and which leaves pressure generator 17 and enters hydraulic circuits 10, 11 when piston 19 is driven and moved by electric motor 20. In addition, FIG. 2 shows a first characteristic curve K1, which indicates the smoothed setpoint input carried out by control unit 24, in comparison with a conventional characteristic curve K, which shows an abrupt setpoint input, as is conventional in the related art. The logistical growth function allows the piston to be accelerated and decelerated slowly, so that jerky movements of piston 19 are prevented.

For that purpose, the logistical growth function mentioned below is used by control unit 24:

$$y(t) = y(t - \Delta t) + R \cdot y(t - \Delta t) \cdot \left(1 - \frac{y(t - \Delta t)}{K}\right),$$

where y(t) represents the setpoint value at time t, y(t−Δt) represents the setpoint value at the previous time, R represents the growth rate, and K represents the step height of the setpoint value.

The step height and the growth rate are selected, in particular, as a function of the construction of brake system 1, in order to allow optimum control of pressure generator 17 in the testing principle.

Figure 3:
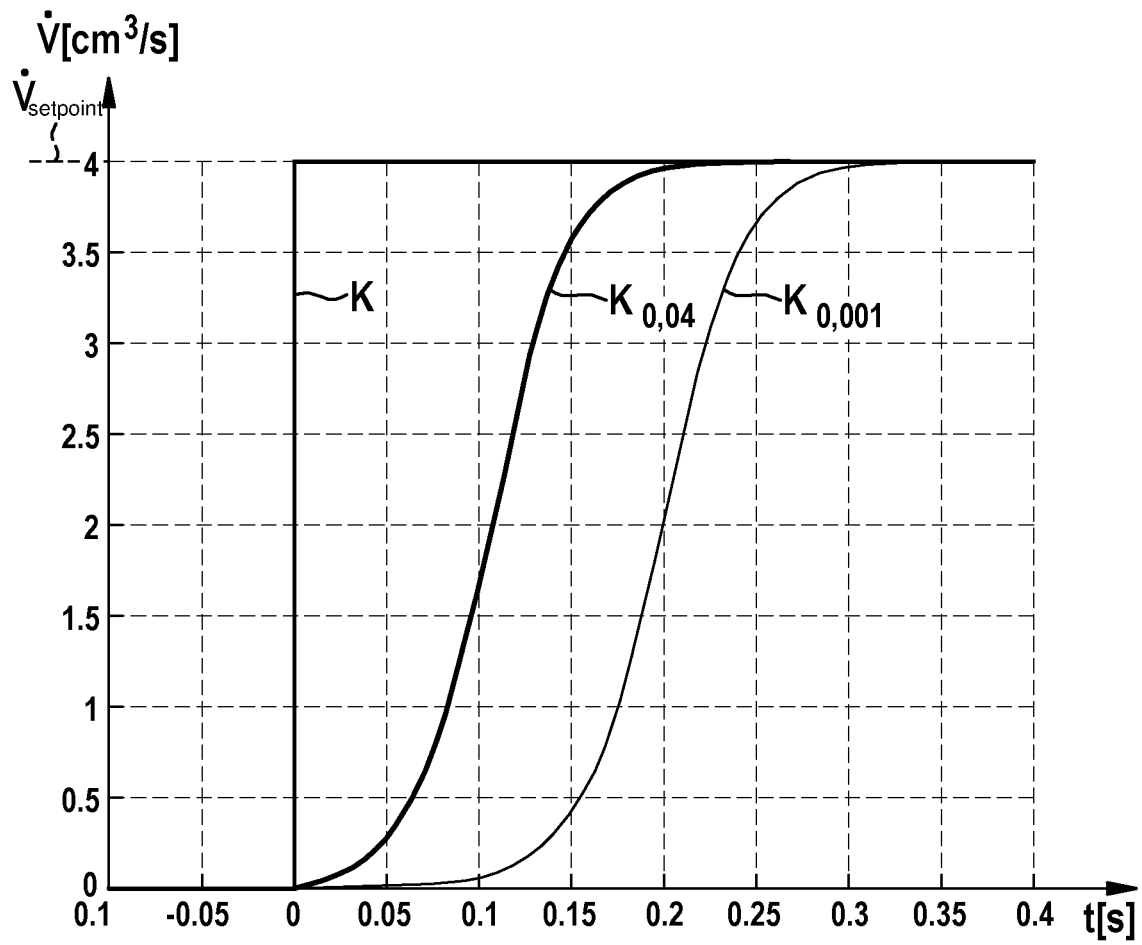
FIG. 3 shows a second graph for explaining advantageous operation of the brake system from FIG. 1 in accordance with an example embodiment of the present invention.

To that end, FIG. 3 shows volumetric flow rate $\dot{V}$ plotted versus time t as a function of different starting values y(0), where a first characteristic curve $K_{0.04}$ indicates the behavior of the logistical growth function, that is, the control of pressure generator 17, for a starting value of 0.04, and a second characteristic curve $K_{0.001}$ indicates it for a starting value of y(0)=0.001.

Figure 4:
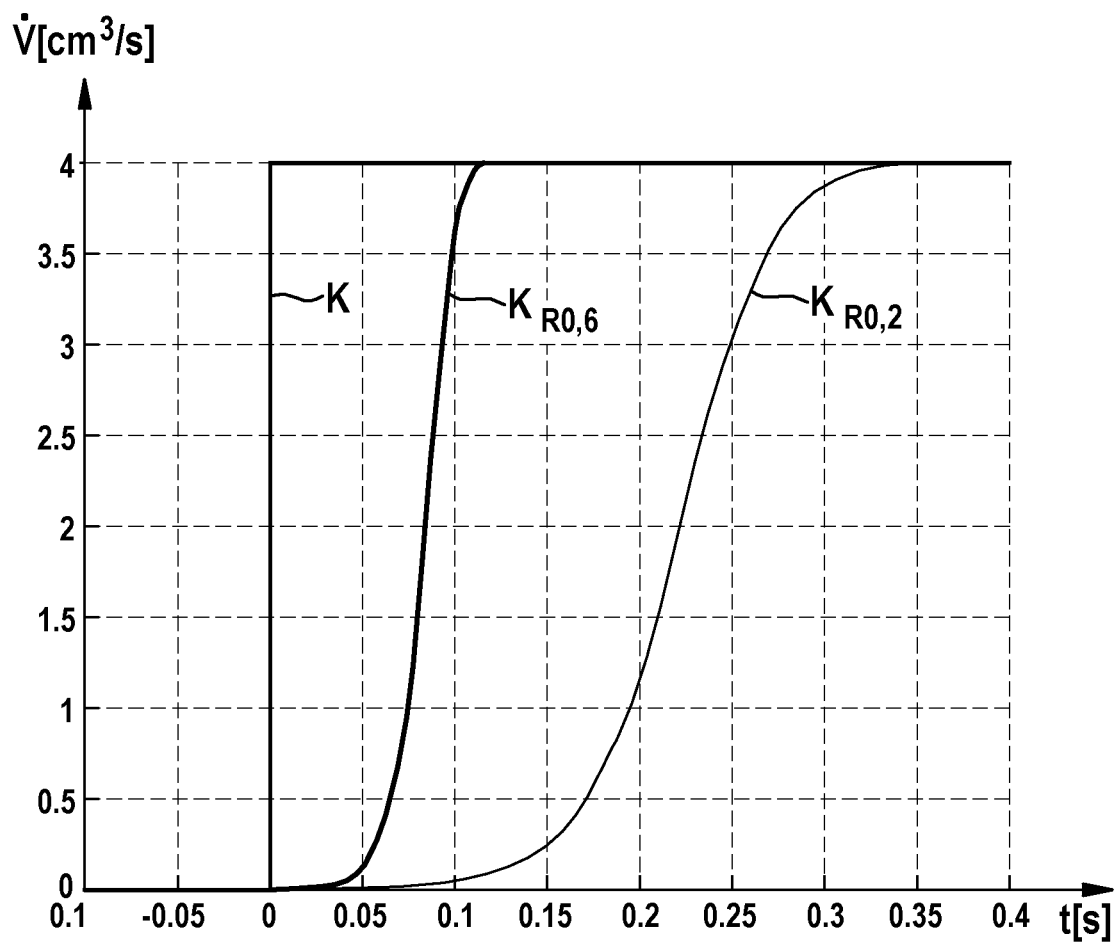
FIG. 4 shows a third graph for explaining advantageous operation of the brake system from FIG. 1 in accordance with an example embodiment of the present invention.

FIG. 4 shows two further characteristic curves, which, with regard to the previous exemplary embodiment according to FIG. 3, differ due to different growth rates R. In this context, a first characteristic curve $K_{R0.6}$ indicates the growth rate of R=0.6, and a second characteristic curve $K_{R0.2}$ indicates the growth rate for R=0.2.

In another exemplary embodiment, a setpoint end value of 4 cm³/s is set. With the aid of the logistical growth function, the different growth rates and starting values prevent jerky movement of piston 19 from happening. In particular, starting value y(0) is selected to be much smaller than step height K, for example, 1% or less, so that in this case, a starting value y(0) of between 0.05 and 0.0005, in particular, between 0.04 and 0.001, or, in particular, of 0.04 or 0.001, results. In particular, values between 0.7 and 0.1, in particular, between 0.6 and 0.2, are selected as a growth rate R. It is particularly preferable for the growth rate to be set to 0.6 or 0.2 by control unit 24. As already mentioned, the values are selected, in particular, as a function of brake system 1 and its components.

Growth rate R influences the stationary acceleration of the setpoint value and, consequently, how rapidly the changes in the setpoint input are reached. If the setpoint input does not take place prior to a value of Y=0, then suitable offset correction is preferably undertaken.

Due to the advantageous action, the prevention of jerky movements minimizes noise generation of pressure device 17 and vibrations introduced to brake system 1, which means that wear of pressure generator 17 and other components of brake system 1 is reduced, and consequently, the service life of pressure generator 17 and of brake system 1 is increased on the whole. In addition, incorrectly activated driver warnings and degradation of the system are prevented as a result of the reduced wear.

What is claimed is:

1. A method for operating a brake system of a motor vehicle, the brake system including a master brake cylinder operable by a user and a pressure generator driven by an electric motor, for generating a hydraulic system pressure, and including at least one hydraulically operable friction brake, on an inlet side, the at least one friction brake being assigned a proportioning valve acted upon by the system pressure, to adjust a hydraulic actuating pressure for the friction brake, the method comprising:
    providing to the pressure generator a setpoint value for carrying out a testing operation;
    wherein the setpoint value is selected so as to be smoothed by a logistical growth function.

2. The method as recited in claim 1, wherein the following logistical growth function is used:

$$y(t) = y(t - \Delta t) + R \cdot y(t - \Delta t) \cdot \left(1 - \frac{y(t - \Delta t)}{K}\right)$$

where y(t) represents the setpoint value (y) at time t, y(t−Δt) represents the setpoint value (y) at a previous time, R represents a growth rate, and K represents a step height of the setpoint value (y).

3. The method as recited in claim 2, wherein a value that is 1% of the step height or less, is selected as starting value y(0).

4. The method as recited in claim 2, wherein a value between 0.05 and 0.0005 is set as starting value y(0).

5. The method as recited in claim 2, wherein a value between 0.04 and 0.001 is set as a starting value y(0).

6. The method as recited in claim 2, wherein a value of 0.04 or 0.001 is set as a starting value y(0).

7. The method as recited in claim 2, wherein the growth rate (R) is set to a value between 0.7 and 0.1.

8. The method as recited in claim 2, wherein the growth rate (R) is between 0.6 and 0.2.

9. The method as recited in claim 2, wherein the growth rate (R) is 0.6 or 0.2.

10. A device for operating a brake system, the brake system including a master brake cylinder operable by a user and a pressure generator driven by an electric motor, for generating a hydraulic system pressure, and including at least one hydraulically operable friction brake, on an inlet side, the at least one friction brake being assigned a proportioning valve acted upon by the system pressure, to adjust a hydraulic actuating pressure for the friction brake, the device comprising:
    a control unit configured to give the pressure generator a setpoint value for carrying out a testing operation;
    wherein in normal use, the control unit being configured to select the setpoint value so as to be smoothed by a logistical growth function.

11. A brake system, comprising:
    a master brake cylinder operable by a user;
    a pressure generator driven by an electric motor, for generating a hydraulic system pressure;
    at least one hydraulically operable friction brake, wherein, on an inlet side, the at least one friction brake being assigned a proportioning valve acted upon by the system pressure, to adjust a hydraulic actuating pressure for the friction brake; and
    a device including a control unit configured to give the pressure generator a setpoint value for carrying out a testing operation;
    wherein in normal use, the control unit being configured to select the setpoint value so as to be smoothed by a logistical growth function.

12. A motor vehicle including a brake system, the brake system comprising:
    a master brake cylinder operable by a user;
    a pressure generator driven by an electric motor, for generating a hydraulic system pressure;
    at least one hydraulically operable friction brake, wherein, on an inlet side, the at least one friction brake being assigned a proportioning valve acted upon by the system pressure, to adjust a hydraulic actuating pressure for the friction brake; and
    a device including a control unit configured to give the pressure generator a setpoint value for carrying out a testing operation;
    wherein in normal use, the control unit being configured to select the setpoint value so as to be smoothed by a logistical growth function.

* * * * *